(12) United States Patent
Poichot et al.

(10) Patent No.: US 11,667,356 B2
(45) Date of Patent: Jun. 6, 2023

(54) SYSTEM FOR TRANSFERRING CRYOGENIC PRODUCT BETWEEN TWO SHIPS PLACED SIDE BY SIDE

(71) Applicant: FMC Technologies, Sens (FR)

(72) Inventors: Raphaël Poichot, Auxerre (FR); Stéphane Paquet, Septeuil (FR)

(*) Notice: Subject to any disclaimer, the term of this patent is extended or adjusted under 35 U.S.C. 154(b) by 29 days.

(21) Appl. No.: 16/956,518

(22) PCT Filed: Dec. 21, 2018

(86) PCT No.: PCT/EP2018/086542
§ 371 (c)(1),
(2) Date: Jun. 19, 2020

(87) PCT Pub. No.: WO2019/122316
PCT Pub. Date: Jun. 27, 2019

(65) Prior Publication Data
US 2021/0129946 A1 May 6, 2021

(30) Foreign Application Priority Data
Dec. 22, 2017 (FR) .................................... 1763195

(51) Int. Cl.
*B63B 27/34* (2006.01)
*B63B 27/24* (2006.01)
*B67D 9/02* (2010.01)

(52) U.S. Cl.
CPC ............... *B63B 27/24* (2013.01); *B67D 9/02* (2013.01); *F17C 2221/014* (2013.01); *F17C 2223/0161* (2013.01); *F17C 2270/0105* (2013.01)

(58) Field of Classification Search
CPC ............ B63B 27/24; B63B 27/34; B67D 9/02

USPC ........................................................ 141/387
See application file for complete search history.

(56) References Cited

U.S. PATENT DOCUMENTS

| 2,648,201 | A | 8/1953 | Marancik et al. |
| 3,050,092 | A | 8/1962 | Palcanis |
| 4,202,372 | A | 5/1980 | Gibbons |
| 6,719,008 | B1* | 4/2004 | LeDevehat ............. B67D 9/02 137/615 |

(Continued)

FOREIGN PATENT DOCUMENTS

WO    WO 99/48752 A1    9/1999

OTHER PUBLICATIONS

Original of WO 2014122122 A1; Albrigtsen Rolf, Høvik Jon; Aug. 14, 2014.*

*Primary Examiner* — Paul J Gray (57) ABSTRACT

The present invention concerns a system for the transfer of cryogenic product from a first floating structure (800) for storage and transport of cryogenic product to a second fixed or floating structure (900) for storing cryogenic product, by means of a transfer pipe able to transport the cryogenic product. The system comprises a transfer pipe, itself comprising at least three rigid sections of pipe (12-17) fluidically connected each to the next by connection means (21 to 27) able to transport the cryogenic product, each of the two end sections of pipe (12, 17) having a free end configured as a tip for connection to a connection device of the first floating structure (800) and respectively of the second floating structure (900). The present invention also concerns a method of fluidically connecting a device for the transport of cryogenic product.

14 Claims, 6 Drawing Sheets

(56) References Cited

U.S. PATENT DOCUMENTS

2009/0295150 A1    12/2009   Dupont et al.

* cited by examiner

SYSTEM FOR TRANSFERRING CRYOGENIC PRODUCT BETWEEN TWO SHIPS PLACED SIDE BY SIDE

The invention relates to a system for transferring cryogenic products between two structures placed side by side during the transfer, the first structure being a floating structure for storage and transport of cryogenic product, such as a methane tanker (referred to below as "LNGC") and the second structure being a fixed or floating (freely or moored) structure such as a methane tanker converted into a terminal for reception and storage of cryogenic products, of FSRU type (FSRU standing for Floating Storage and Regasification Unit). The cryogenic product may, without being limitative, be liquefied gas, such as liquefied natural gas (referred to below as "LNG"), liquid ethane, or liquid ethylene.

BACKGROUND OF THE INVENTION

A first known solution is a transfer system comprising at least one flexible pipe. However, this type of transfer system has a very limited range of movement. More particularly, this transfer arm comprises flexible pipes. However, flexible pipes must not be bent beyond a certain limit in order not to be damaged. Furthermore, the rate of flow is limited by high losses in pressure from the flexible pipes, in particular on the vapor return line in which the pressure losses must be minimal.

A second solution is described in patent application WO 99/48752. However, the transfer arm, described in that document, has a limited range of movement. Furthermore, the sections of rigid pipe employed in the cited application require to be supported in the zone between the two ships.

This solution is also very constraining, in particular because it requires the use of a crane throughout the time of transfer of a cryogenic product between for example an LNGC and an FSRU.

SUMMARY OF THE INVENTION

The present invention is directed to providing a system for the transfer of cryogenic product from a first floating structure for storage and transport of cryogenic product to a second fixed or floating structure for storing cryogenic product placed side by side and not having the drawbacks mentioned above and furthermore leading to other advantages.

To that end, according to a first aspect the present invention concerns a system for the transfer of cryogenic product from a first floating structure for storage and transfer of cryogenic product to a second fixed or floating structure for storing cryogenic product, by means of a transfer pipe able to transport the cryogenic product. The transfer system comprises a transfer pipe, which itself comprises at least three rigid sections of pipe fluidically connected each to the next by connection means able to transport the cryogenic product, each of the two end sections of pipe having a free end configured as a tip for connection to a connection device of the first floating structure and respectively of the second floating structure.

Such a solution has numerous advantages and in particular those of fast implementation and avoids the permanent use of a hoisting device dedicated to the transfer of fluid.

According to other possible features, taken in isolation or in combination one with another:

at least one of the connection means comprises a cryogenic swivel joint connected to each of the ends of two successive sections of pipe by at least one bent tube or to a bent end of each of the two successive sections of pipe;

the transfer pipe comprises a short chain comprising five cryogenic swivel joints having an axis disposed in the vertical plane and linking four sections of rigid pipe each to the next, and the short chain is linked to each of the connection devices of the structures by a rigid tubular assembly for connection of the transfer pipe and on each of which is interposed a set of two cryogenic swivel joints having an axis arranged with the swivel joints for linking to the short chain so as to provide with them three degrees of rotational freedom;

the transfer pipe extends freely as a short chain over part of its length between the connection devices of the first and second floating structures at the time of transferring cryogenic product;

the system comprises connection devices configured to be disposed respectively on the first structure and the second floating structure, each connection device comprising an extension pipe configured to be connected to a collecting device of the associated structure and to a tip of the transfer pipe;

at least one of the end sections of pipe of the transfer pipe comprises a hooking means for hooking to hoisting means;

the connection device of the first structure comprises a centering part having an upwardly open cut-out configured to guide a complementary part of a tip of the transfer pipe towards a connection position of the tip situated at the bottom of the cut-out;

the system comprises a support mounting for the free end of each extension pipe;

an interstice is provided between the extension pipe of the first structure and its support mounting or between the support mounting and the structure carrying it so as to enable predetermined bending of the extension pipe after connection of the tip of the transfer pipe to that extension pipe;

the system comprises a device for storage of the transfer pipe in folded state, comprising a vertical support erected on the base of the device for each free end of the transfer pipe, so as to be able to dispose the transfer pipe in a configuration folded in the storage device into a trapezoidal shape.

According to a second aspect the present invention concerns a method of fluidically connecting a system comprising the following steps:

Forming the connection between the transfer pipe and the extension pipe of the second structure;

Moving the transfer pipe above the extension pipe of the first structure using a cable linked to a hoisting apparatus, such a crane;

Lowering the free tip of the transfer pipe towards a connection coupling of the extension pipe located on the first structure;

Hooking the free tip to the extension pipe by means of the centering part and the complementary part; and Fastening the free tip to the connection coupling.

Still other particularities and advantages of the invention will appear in the following description of non-limiting examples, made with reference to the accompanying drawings, in which:

DETAILED DESCRIPTION OF THE INVENTION

Figure 1:
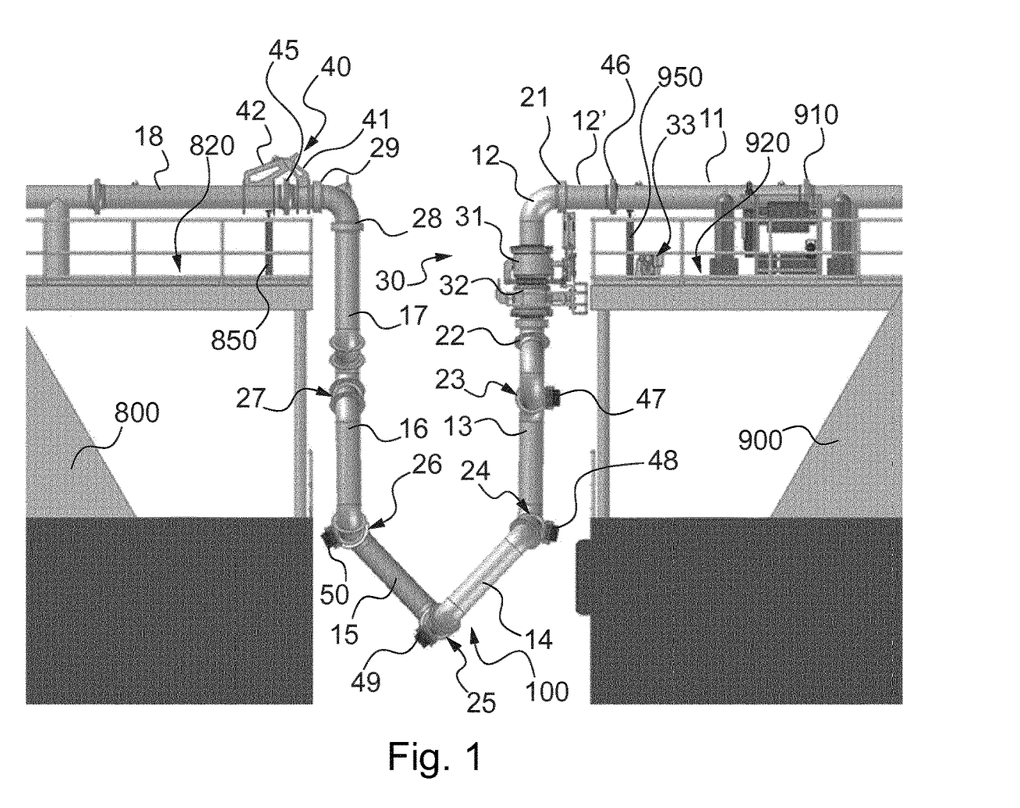
FIG. 1 is a diagrammatic side view of a device in accordance with an embodiment of the invention.

FIG. 1 represents a diagrammatic side view of a short-chain transfer system for the transfer of cryogenic product from a first floating structure 800 for storage of cryogenic product (here a LNGC) to a second fixed or floating structure 900 for storing cryogenic product (here an FSRU), comprising a transfer pipe formed from rigid sections of pipe configured for transporting the cryogenic product between an extension pipe 18 linked to the first structure 800 and an extension pipe 11 linked to the second structure 900, the sections of pipe being fluidically connected each to the next by connection means 21 to 27 able to transport the cryogenic product.

A extension pipe 11 is linked at one of its ends to the second structure by a collecting device 910 and at its other end to a section of transfer pipe by two bolted couplings 46.

A bent portion 12 is linked by a cryogenic swivel joint 21 to a transfer pipe tip 12' bearing the linking coupling to a coupling of the extension pipe 11 (cf. the pair of couplings 46 in FIG. 1).

The cryogenic joint 21 has its horizontal main axis in the plane of the drawing paper. Thus, this structure enables rotation of the transfer system in a vertical plane.

The bent portion 12 is linked to the rest of the transfer system by an ERS 30, which latter will be described later.

The ERS comprises in particular a lower part 32 linked to a section of pipe of half-circular general shape.

The half-circle section of pipe comprises two bent sections abutted so as to form a half-circle. The upper part of the half-circle section of pipe is linked to the lower part 32 of the ERS by a cryogenic swivel joint 22 and at its other end by a cryogenic swivel joint 23 to a bent section of pipe 13.

The cryogenic swivel joint 22 has its vertical main axis in the plane of the drawing paper and enables a rotation around the main axis of the ERS 30.

The cryogenic swivel joint 23 has its horizontal main axis in a plane perpendicular to the drawing paper and enables a movement in the plane of the drawing paper.

Thus, the specific arrangement of the three cryogenic swivel joints 21 to 23 makes it possible to obtain movements in three dimensions of the system for transfer between two structures.

Next there are represented four bent sections of pipe 13 to 16 linked to each other by a cryogenic swivel joint 24 to 26.

In other words, the bent section of pipe 13 is linked to the bent section of pipe 14 by a cryogenic swivel joint 24 of which the horizontal main axis is perpendicular to the plane of the drawing paper.

The bent section of pipe 14 is linked to the bent section of pipe 15 by a cryogenic swivel joint 25 of which the horizontal main axis is also perpendicular to the plane of the drawing paper.

The bent section of pipe 15 is linked to the bent section of pipe 16 by a cryogenic swivel joint 26 of which the horizontal main axis is also perpendicular to the plane of the drawing paper.

The bent section of pipe 16 is linked to the extension pipe 18 by three abutted bent sections immobile relative to each other.

In other words, the bent section of pipe 16 is linked to the bent section of pipe 17 via a section comprising three bent sections abutted so as to form a half-circle terminated by a section bent at 90° to its upper part. The lower part of the half-circle section is linked to the bent section of pipe 16 by a cryogenic swivel joint 27. The upper part of the section is immobile relative to the bent section of pipe 17.

The cryogenic swivel joint 27 has its horizontal main axis in a plane perpendicular to the drawing paper and enables a movement in the plane of the drawing paper.

The upper part of the bent section of pipe 17 is linked to the extension pipe 18 via a cryogenic swivel joint 28, a bent portion, a second cryogenic swivel joint 29 and a coupling tip forming with the coupling of the extension pipe 18 a pair of couplings 45.

The cryogenic swivel joint 28 has its vertical main axis in the plane of the drawing paper and enables a rotation around the main axis of the bent section of pipe 17.

The cryogenic joint 29 has its horizontal main axis in the plane of the drawing paper. Thus, this structure enables rotation of the transfer arm in a vertical plane.

Furthermore, the short chain part 100 of the transfer pipe is constituted here by the sections of pipe 13 to 16 linked each to the next and to the rest of the structure by cryogenic swivel joints 23 to 27. The number of such sections of pipe may in practice be reduced to three or be greater than four.

At the location of each metal bent portion is disposed at least one reinforcing collar making it possible to avoid flattening of the metal bent portion under the effect of high loads. In the embodiment represented in FIG. 1, the reinforcing collar is constituted by a metal circle welded to the periphery of the bent portion.

It will be noted in this connection that a section of pipe may in practice be represented just by a bent portion.

Moreover, the arrangements of the axes and planes as mentioned supra correspond in practice to those of the structures 800 and 900 when they are placed side by side without being either inclined or offset longitudinally relative to each other.

It will furthermore be noted that each extension pipe towards the edge of the structure and its connection coupling form a connection device for the transfer pipe.

The connection means are cryogenic swivel joints here with a rotational axis. As a variant, it may be envisaged to use flexible sections of pipe.

Furthermore, each pipe or section of pipe 11 to 18 here is of uniform construction, of preferably between 6 and 20 inches (1 inch=2.54 cm). However, as a variant, they may be variable.

The extension pipe 11, on the second floating structure 900, is carried by a support 950 and linked to a device for storage of cryogenic product (not shown in FIG. 1) by a collecting device 910.

The extension pipe 18 is carried at the first floating structure 800 by a support mounting 850 making it possible to take up part of the bending stresses to which a collecting device 810 of the floating structure 800 is subjected when the transfer system is connected via the extension pipe 18.

The two extension pipes 11,18 are linked to the transfer system by bolted couplings 45, 46 making it possible to provide the cryogenic link of the transfer system. As a variant, one of the couplings of each pair of couplings (or of one of the two pairs only) may be replaced by a coupler.

In practice, at least two transfer systems are installed when a fluid transfer is carried out. A transfer system provides the transfer of the useful cryogenic fluid, that is to say the liquefied gas. A second transfer system of the same type provides the return of cold vapor (which is cryogenic in practice) in parallel with the transfer of cryogenic fluid.

As can still be seen in FIG. 1, the short chain transfer system comprises a self-supporting short chain 100. In other words, no hoisting device is required during the phase of transferring cryogenic fluid.

As already indicated, this short chain 100 comprises at least three rigid bent sections of pipe, here four 13, 14, 15, 16, situated in the vertical plane, able to transport cryogenic fluid.

In this case, by bent it is meant that the sections are bent at their end or that bent portions are welded to the ends of straight sections.

The four bent sections of pipe 13 to 16 are linked together each to the next by three cryogenic joints 24 to 26.

As also indicated supra, the short chain 100 is next linked to the extension pipes 11, 18 via the section of pipe 17, bent portions and connection means 21-23 and 27-29.

Figure 2:
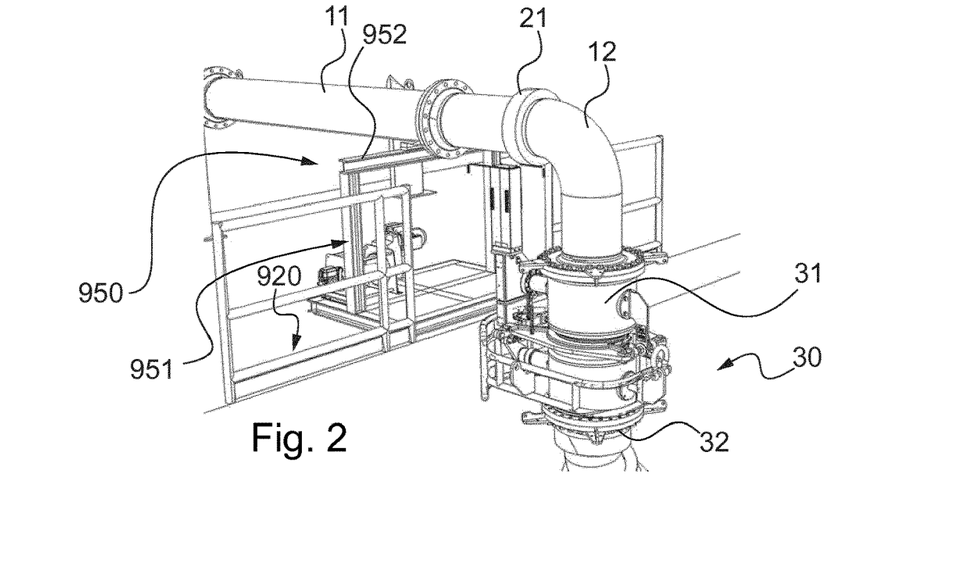
FIG. 2 is a detail side view according to an embodiment of the invention in particular representing the support mounting of the free end of the extension pipe.

In the embodiment represented in FIG. 2, an Emergency Release System 30, commonly called ERS system, is disposed at the bent portion 12. Of course, in an alternative embodiment, the Emergency Release System 30 could be disposed at another section of pipe such as the section of pipe 17 linked to the extension pipe 18 on the first floating structure 800.

The ERS 30 comprises two parts: an upper part 31 linked to the bent portion 12 and a lower part 32 linked to the connection means 22. In case of emergency stoppage, the two parts of the ERS 30 detach. The lower part 32 is kept from free fall by a cable—not shown—linked to a winch 33 disposed on the deck 920 of the second floating structure 900.

The winch makes it possible to control the fall of the short chain 100 towards its position of vertical equilibrium along the hull of the LNGC 800. Bumpers 47-50, here of neoprene, disposed on the short chain (at the location of the connection means) enable the hull to be protected.

The cable is not fastened to the winch drum and is naturally released from the drum at the end of unreeling.

The extension pipe 11 is linked here to the moored or floating structure 900 via a support mounting 950 comprising two vertical rigid arms 951 linked at one end to the deck of the second floating structure 900 and at a second end to a cross-bar 952 for supporting the extension pipe 11.

Figure 3A:
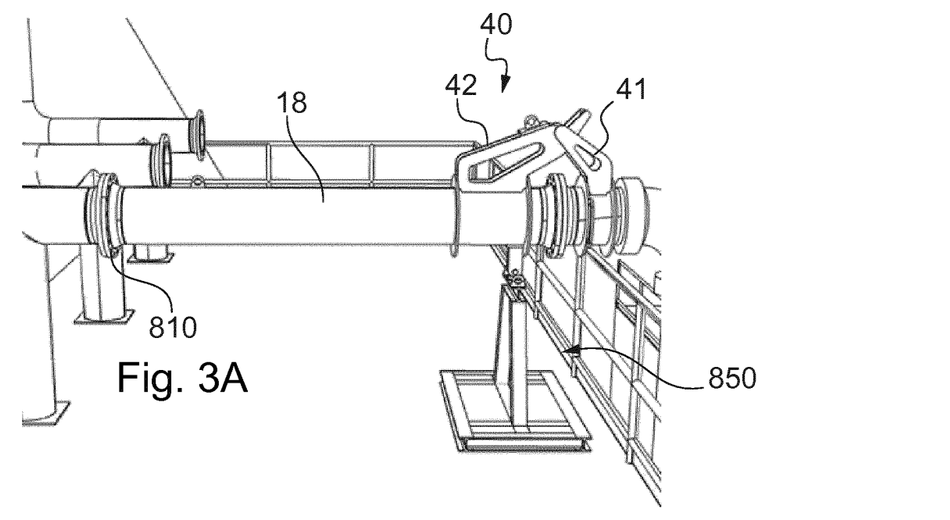
FIG. 3A is a detail side view of the support mounting of the system on the first floating structure according to an embodiment.
Figure 3B:
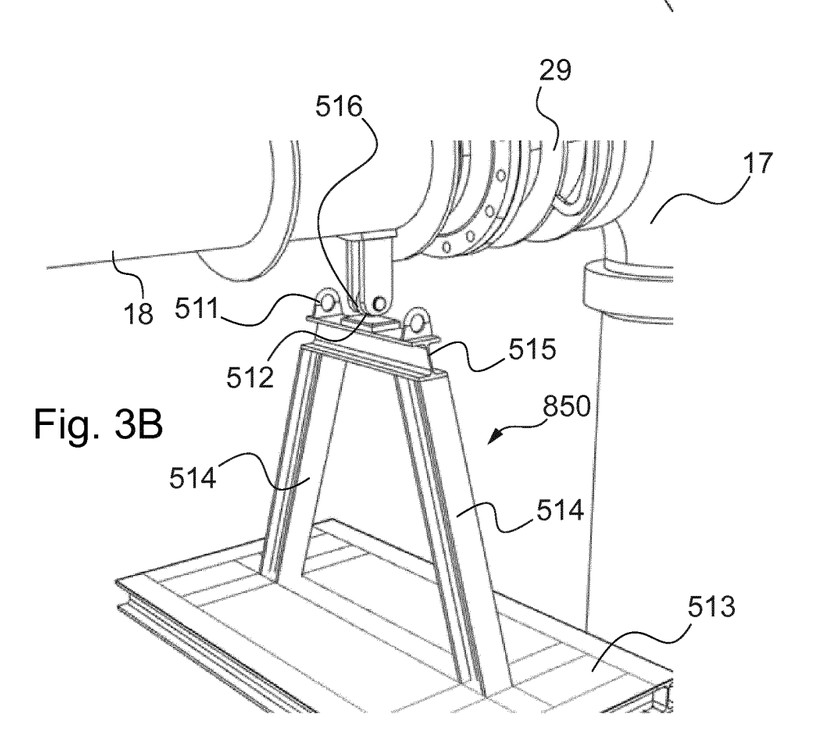
FIG. 3B is a detail view of the link between the support mounting in relation with the LNGC and the extension pipe according to an embodiment of the invention.

In the embodiment represented in FIGS. 3A and 3B, a support mounting for the connection pipe 850 is represented.

The support 850, represented here, comprises a rectangular base 513 on which rest two substantially vertical beams 514. These beams bear a horizontal beam 515 on which is placed, here, a shim 512. The bearing of the extension pipe 18 is made via a roller 516.

The support mounting 850 makes it possible to reduce the stresses on the collecting device 810 when the transfer system is connected.

Play exists before connection of the short chain 100. When the short chain 100 is connected, the extension pipe 18 is bent and comes to bear on the shim 512.

This is a means for reducing the vertical load transmitted to the platform of the LNGC by acting on the collecting device 810 to the maximum of its capacity at the time of bending.

This is an optional arrangement.

The support 850 is furthermore provided to allow for the thermal shrinkage of the extension pipe 18.

If required, the support mounting can comprise lateral stops 511 to take up the lateral loads of the short chain 100. In the normal way, these loads are small and do not generate excessive bending moment on the collecting device 810.

In one alternative embodiment, the support mounting 850 forms part of the extension pipe 18 and the space enabling the shim to be fitted is located between the deck 820 of first floating structure 820 and the base 513 of the support mounting 850.

Figure 4A:
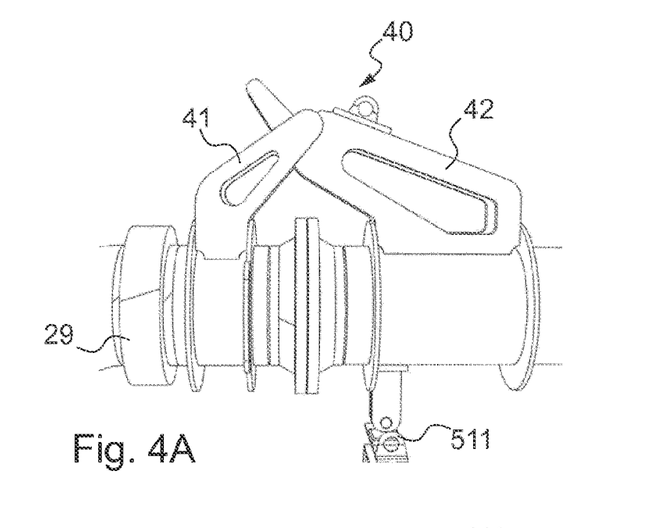
FIG. 4A is a detail side view of a locked transfer system according to an embodiment of the invention.
Figure 4B:
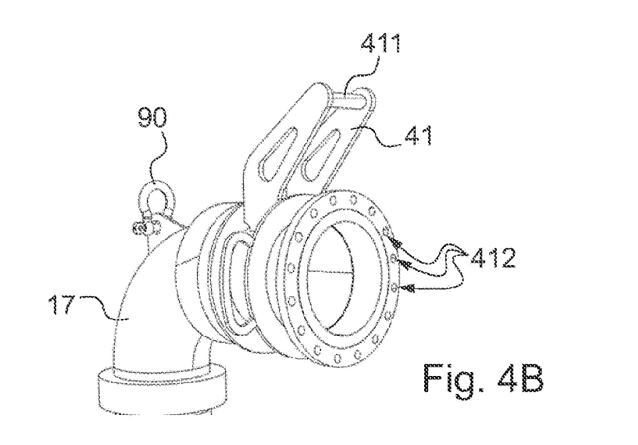
FIG. 4B is a detail side view of the centering part of the guiding and holding system according to an embodiment of the invention.
Figure 4C:
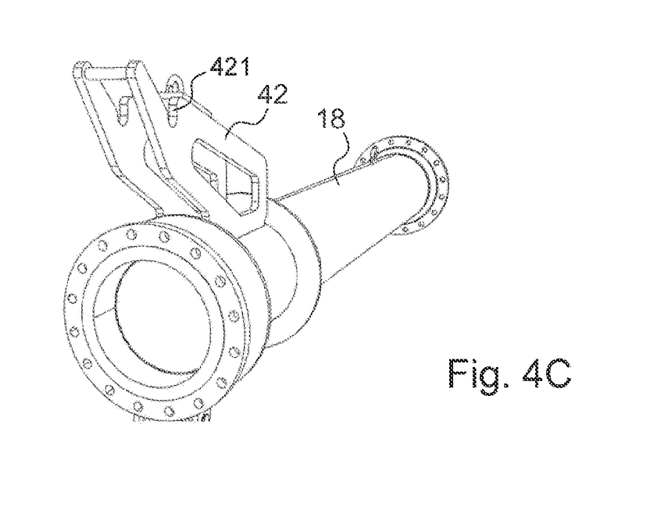
FIG. 4C is a detail side view of the complementary part of the guiding and holding system according to an embodiment of the invention.

In the embodiment represented in FIGS. 4A to 4C a linkage system 40 is represented.

The linkage system 40 makes it possible to facilitate the connection between the extension pipe 18 and the section of pipe 17 at the time of the connection phase. Thus, the maintenance time is in particular optimized.

More specifically, the linkage system 40 comprises two parts cooperating with each other: a male part 41 linked to the section 17 and a female part 42 linked to the extension pipe 18. The female part 42 comprises an upwardly open cut-out 421, which is hook-shaped here, and configured receive the male part 41 forming the complementary part and comprising for such purpose a ring-shaped part 411 (here two parallel lugs fastened to the section 17, between which extends a rod, perpendicularly to the lugs).

When the two parts 41, 42 are linked, the fastening of the link is maintained by means of screw-nut type fastening by virtue of the bores 412.

This linkage system has the advantage of guiding the end of the transfer system but also of keeping the ends linked when the hoisting device, enabling the connection to be established, is no longer used.

Figure 5A:
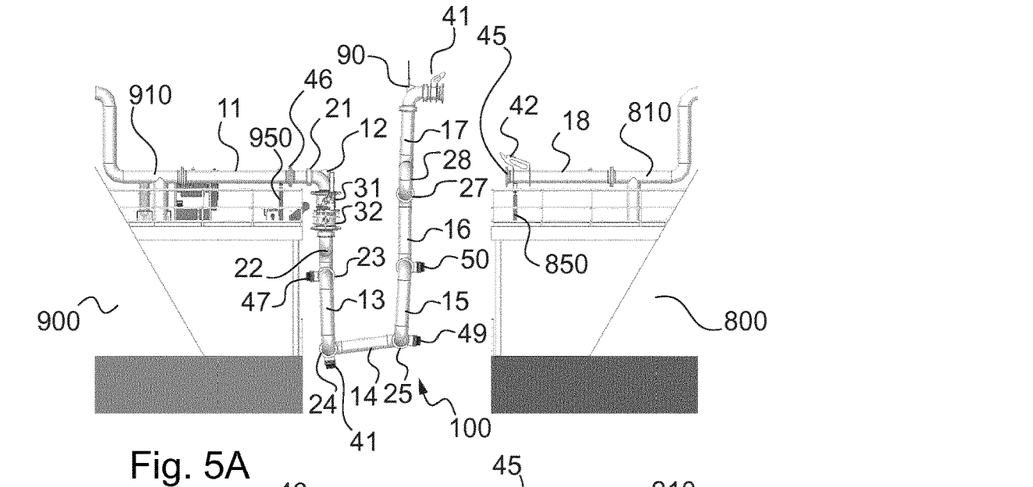
FIG. 5A is a side view of a device in course of connection according to an embodiment of the invention.
Figure 5B:
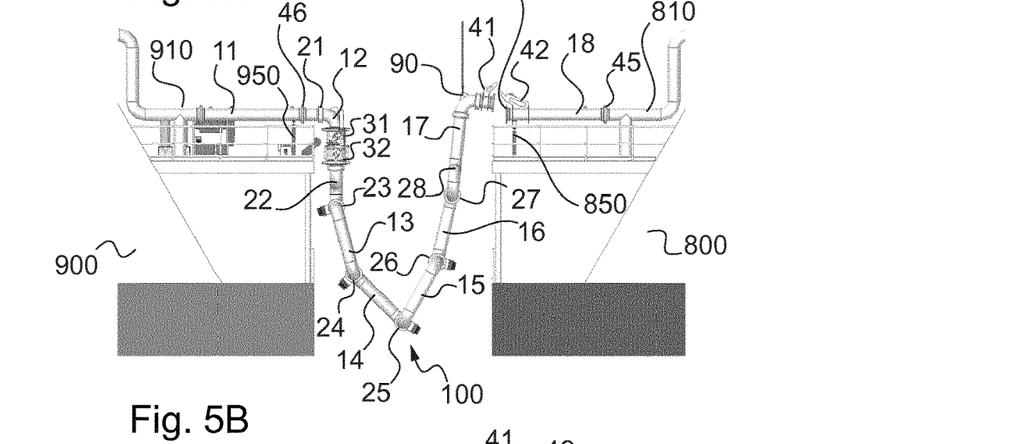
FIG. 5B is a side view of a device before connection according to an embodiment of the invention.
Figure 5C:
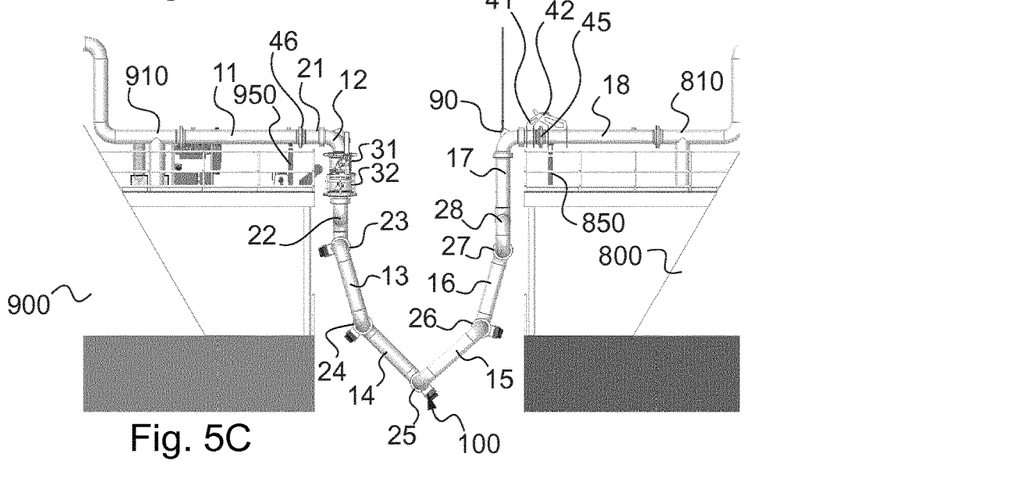
FIG. 5C is a side view of a connected device according to an embodiment of the invention.

In the embodiment represented in FIGS. 5A to 5B, a linking method is represented in different steps.

In FIG. 5A, the transfer system is already linked to the floating structure 900 by the section of pipe 12' and is held in elevation at its other end above the level of the pipe 11 by means of a hoisting device, such as a crane, by a ring 90 or an equivalent hitching means for a hook of a hoisting device. There may be a second one, as a variant, on the opposite side of the transfer pipe.

When the male and female parts 41, 42 are placed in communication, with reference to FIG. 5B, the transfer arm comes to a higher level than the free end of the extension pipe 18. Thus, these parts 41, 42 of the linkage system 40 may cooperate before the transfer pipe and the extension pipe 18 are face to face for them to be bolted.

Figure 6A:
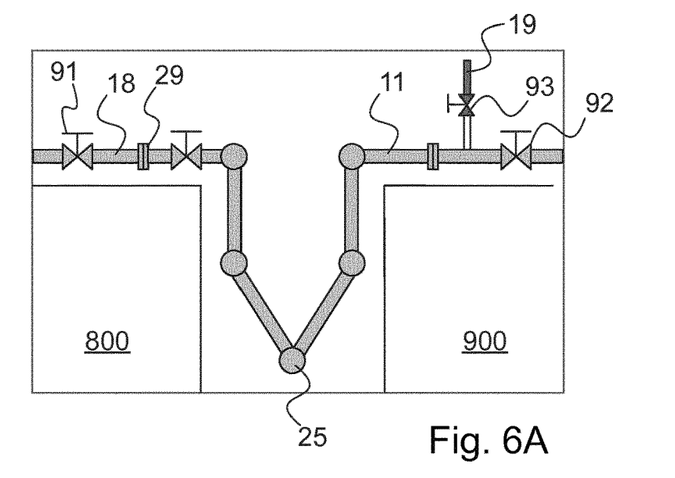
FIG. 6A is a very diagrammatic side view representation of a device and of the main valves necessary for purging the device.
Figure 6B:
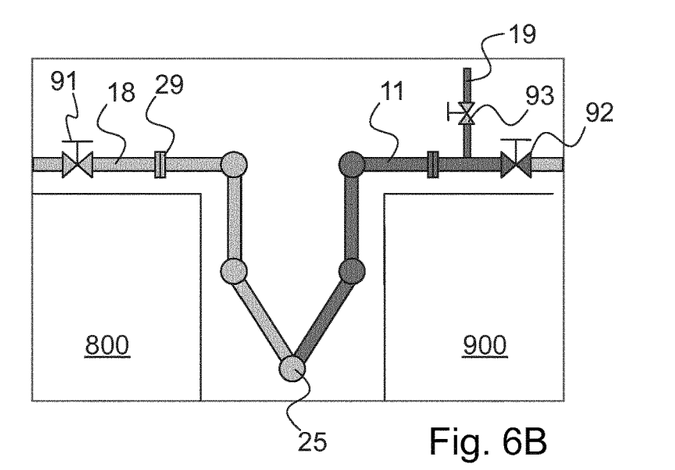
FIG. 6B is a very diagrammatic side view representation of a connected device on passage of nitrogen within the sections of pipe for purging the device.

In the embodiment represented in FIGS. 6A to 6B, a purging method is represented in different steps.

In FIG. 6A, the pipe 18 linked to the collecting device on the floating structure 800 comprises a two-way valve 91 enabling the cryogenic liquid to be stopped or allowed to be conveyed to the second floating structure 900. The extension pipe 11 linked to the collecting device of the second floating structure 900 also comprises a two-way valve 92 enabling the cryogenic liquid to be stopped or allowed to be conveyed to the storage device—not shown-. The extension pipe 11 is linked to a nitrogen supply pipe 19 linked to a pressurized nitrogen network enabling nitrogen to be forcefully inlet into part of the extension pipe 11 of the second floating structure 900 and into the transfer system. The nitrogen supply pipe 19 also comprises a two-way valve 93 enabling the nitrogen to be stopped or allowed to pass into the fluid transfer system.

When cryogenic liquid is transferred, with reference to FIG. 6A, the cryogenic fluid transfer valves 91, 92 are open and the nitrogen supply valve 93 is closed. Thus, the cryogenic liquid can flow between the two floating structures 800, 900.

With reference to FIG. 6B, when the transfer of cryogenic liquid has terminated, the valve of the second floating structure 92 is closed and the valve of the first floating structure 91 stays open. The nitrogen supply valve 93 is open allowing nitrogen to pass into the transfer system. Thus, the amount of cryogenic liquid is reduced in the sections of pipe forming the transfer system.

Figure 6C:
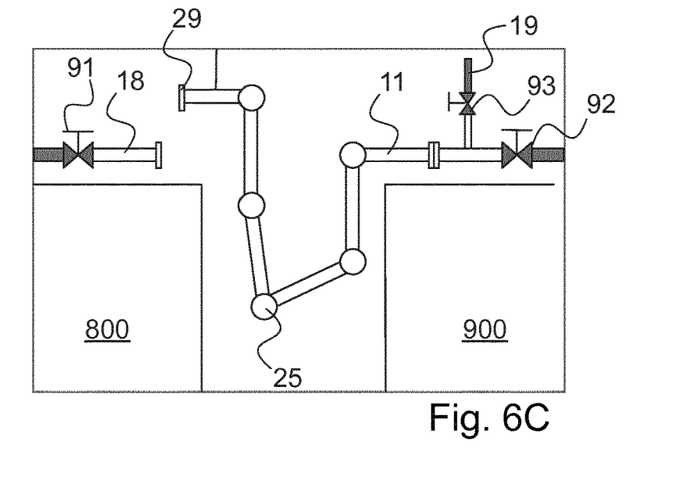
FIG. 6C is a very diagrammatic side view representation of a connected device on disconnection of the device.

With reference to FIG. 6C, the nitrogen supply valve 93 and the valve of the first floating structure 91 are closed when the cryogenic liquid is totally evacuated or evaporated and the pipe rendered inert. The valve of the second floating structure 92 is kept closed. Next, the transfer system is linked to a hoisting device (not shown). Then the transfer system is disconnected at the location of the extension pipe 18 of the first floating structure. The purge is then terminated.

As a variant, the transfer pipe can also include, at the LNGC, one (or two) manual valves enabling isolation of the pipe and the disconnection of the pipe 18 with residual cryogenic liquid which will be evaporated on storage.

Figure 7A:
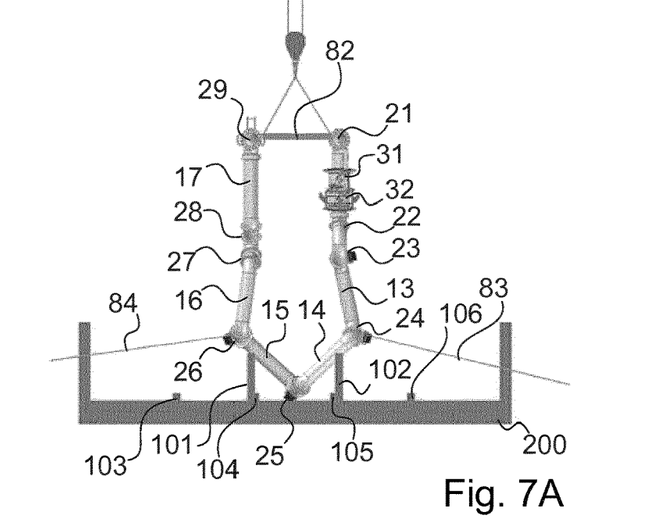
FIGS. 7A and 7B are two very diagrammatic side view representations of a device according to an embodiment in phase of loading onto a container platform.
Figure 7B:
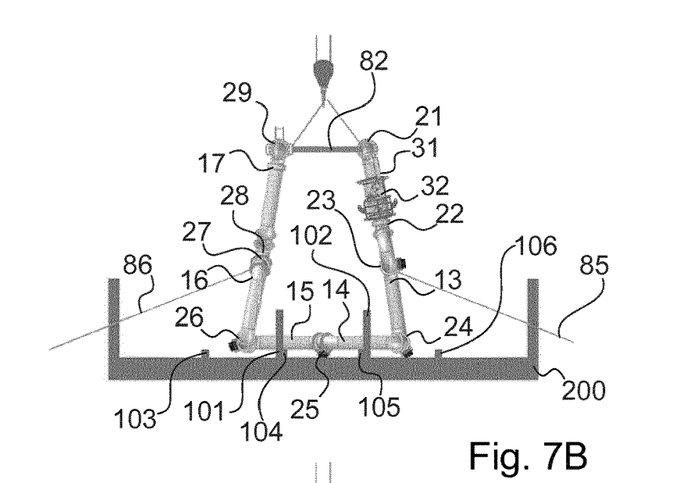
Figure 7C:
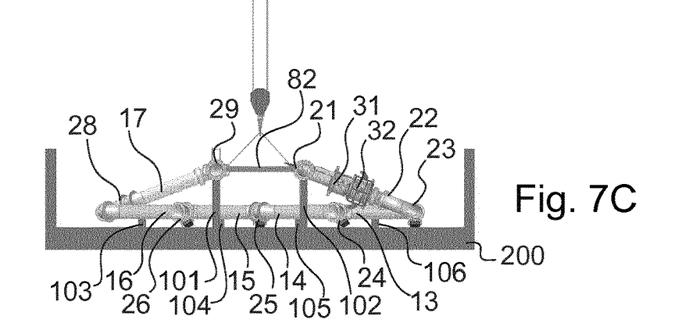
FIG. 7C is a side view of a device according to an embodiment in final phase of loading onto a platform.

In the embodiment represented in FIGS. 7A to 7C, a method of storing the transfer arm is represented in different steps. With reference to FIG. 7A, the transfer system is transported onto a standard container platform by means of a hoisting device. The linking means between the hoisting device and the transfer device comprises a rigid beam 82 enabling the transfer system to be raised using the connection means 21, 29.

When the transfer system is laid on the container platform 200, the connection means 25 is the first to enter into contact with the container platform 200. Next, the connection means 24, 26 are connected to cables 83, 84 by an operator. The cables 83, 84 enable an acute angle to be formed, by pulling on the connection means 24, 26, between the rigid sections of pipes 15,16 and between the rigid sections of pipe 13, 14.

In a same phase or after having disposed the sections of pipe so as to form an acute angle, the hoisting system lowers the transfer system in order for the sections of pipe 14,15 to rest on the container platform. The cables 83, 84 which maintain the acute angle are detached.

Cables 85, 86, such as those used to pull on the preceding connection means 24, 26, are used to pull on the following connection means 23, 27. These cables 85, 86 also enable an acute angle to be formed, by pulling on the connection means 23, 27, between the rigid sections of pipes 16, 17 and between the rigid sections of pipe 12, 13.

In the same way as described above, the hoisting system lowers the transfer system for the sections of pipe 13, 16 to lie on the container platform. The cables 85, 86 are then detached.

The connection means 21, 29 then lie on the vertical rigid supports 101, 102.

The hoisting bar 82 is detached from the transfer arm at the end of the maneuver.

It will furthermore be observed that posts 103, 106 for supporting the sections of pipe are provided on the container platform.

Thus, the transfer arm occupies the place of a container of standard size. The transfer arm does not encumber the hull of a floating structure and is not stowed on a hoisting device, such as a crane.

The temporary storage of the transfer pipe can also be made along the hull of the FSRU by rotation of the transfer pipe through 90° around the "vertical" axis of the connection means 22. The section of pipe 17 is then locked on a mounting at the location of the platform of the FSRU Numerous other variants are possible according to circumstances, and in this connection it is to be noted that the present invention is not limited to the examples represented and described.

In particular, several pipes for transfer and for return of cold vapor may be implemented.

The invention claimed is:

1. A system for transferring cryogenic product from a first floating structure for storage and transport of cryogenic product to a second fixed or floating structure for storing cryogenic product, the system comprising:
   a transfer pipe suitable for transporting the cryogenic product, the transfer pipe comprising at least three rigid sections of pipe fluidically connected each to the next by a respective connection means suitable for transporting the cryogenic product;
   wherein said at least three rigid sections of pipe comprises a first end section of pipe located at a first end of said at least three rigid sections of pipe and a second end section of pipe located at a second end of said at least three rigid sections of pipe;
   wherein the first end section of pipe comprises a free end which is connectable to a first connection device of the first structure and the second end section of pipe comprises a free end which is connectable to a second connection device of the second structure; and
   wherein the first connection device comprises a centering part having an upwardly open cut-out, and wherein the centering part and a complementary part on the free end of the first end section of pipe are configured such that, as the free end of the first end section of pipe is lowered toward the first connection device from a position above the first connection device, the centering part guides the complementary part towards a connection position in which the complementary part is situated at a bottom of the cut-out.

2. The system according to claim 1, wherein at least one of the connection means comprises a cryogenic swivel joint connected to adjacent ends of two successive rigid sections of pipe either directly or by at least one bent tube.

3. The system according to claim 1, wherein each of said connection means comprises a first cryogenic swivel joint, and wherein said at least three rigid sections of pipe comprises a short chain which includes:
    four rigid sections of pipe, including a first rigid section of pipe located at a first end of the short chain and a second rigid section of pipe located at a second end of the short chain, the four rigid sections of pipe being fluidically connected each to the next by a respective first cryogenic swivel joint;
    a second cryogenic swivel joint connected to a free end of the first rigid section of pipe; and
    a third cryogenic swivel joint connected to a free end of the second rigid section of pipe;
    wherein the second and third cryogenic swivel joints are linked to the first and second connection devices, respectively, by a corresponding rigid tubular assembly, each of which includes a set of two fourth cryogenic swivel joints; and
    wherein the first, second, third and fourth cryogenic swivel joints are arranged so as to provide the transfer pipe with three degrees of rotational freedom.

4. The system according to claim 3, wherein the short chain is self-supporting between the first and second connection devices at the time of transferring cryogenic product.

5. The system according to claim 1, wherein each of the first and second connection devices comprises an extension pipe having a first end which is configured to be connected to a corresponding collecting device of the first or second structure and a second end to which the free end of a corresponding first or second end section of pipe is connected.

6. The system according to claim 5, wherein at least one of the first and second end sections of pipe of the transfer pipe comprises a hooking means for hooking to hoisting means.

7. The system according to claim 5, further comprising a support mounting for the second end of each extension pipe.

8. The system according to claim 7, wherein an interstice is provided between the second end of the extension pipe of the first connection device and its corresponding support mounting or between said corresponding support mounting and the first structure so as to enable a predetermined bending of the extension pipe of the first connection device after connection of the transfer pipe to that extension pipe.

9. The system according to claim 1, further comprising a device for storage of the transfer pipe in a folded state, the device for storage comprising a vertical support for each free end of the transfer pipe, wherein the transfer pipe in the folded state in the storage device is configured as a quadrilateral with two parallel sides.

10. A method of fluidically connecting a system for transferring cryogenic product from a first floating structure to a second fixed or floating structure, the system comprising:
    a transfer pipe suitable for transporting the cryogenic product, the transfer pipe comprising at least three rigid sections of pipe fluidically connected each to the next by a respective connection means suitable for transporting the cryogenic product;
    wherein said at least three rigid sections of pipe comprises a first end section of pipe located at a first end of said at least three rigid sections of pipe and a second end section of pipe located at a second end of said at least three rigid sections of pipe;
    wherein the first end section of pipe comprises a free end which is connectable to a first connection device of the first structure and the second end section of pipe comprises a free end which is connectable to a second connection device of the second structure; and
    wherein the first connection device comprises a centering part having an upwardly open cut-out, and wherein the centering part and a complementary part on the free end of the first end section of pipe are configured such that, as the free end of the first end section of pipe is lowered toward the first connection device from a position above the first connection device, the centering part guides the complementary part towards a connection position in which the complementary part is situated at a bottom of the cut-out;
    the method comprising:
        forming a link between a first end of the transfer pipe and an extension pipe of the second structure;
        moving a second end of the transfer pipe above an extension pipe of the first structure using a cable linked to a hoisting apparatus, said second end of the transfer pipe corresponding to the free end of the first end section of pipe;
        lowering the second end of the transfer pipe towards a connection coupling of the extension pipe of the first structure;
        hooking second end of the transfer pipe to the extension pipe of the first structure by means of the centering part and the complementary part; and
        fastening second end of the transfer pipe to the connection coupling.

11. A system for transferring cryogenic product from a first floating structure to a second fixed or floating structure, the system comprising:
    a transfer pipe suitable for transporting the cryogenic product, the transfer pipe comprising at least three rigid sections of pipe fluidically connected each to the next by a respective connection means suitable for transporting the cryogenic product;
    wherein said at least three rigid sections of pipe comprises a first end section of pipe located at a first end of said at least three rigid sections of pipe and a second end section of pipe located at a second end of said at least three rigid sections of pipe;
    wherein the first end section of pipe comprises a free end which is connectable to a first connection device of the first structure and the second end section of pipe comprises a free end which is connectable to a second connection device of the second structure;
    wherein each of the first and second connection devices comprises an extension pipe having a first end which is configured to be connected to a corresponding collecting device of the first or second structure and a second end to which the free end of a corresponding first or second end section of pipe is connected;
    wherein the system further comprises a support mounting for the second end of each extension pipe; and
    wherein an interstice is provided between the second end of the extension pipe of the first connection device and its corresponding support mounting or between said corresponding support mounting and the first structure so as to enable a predetermined vertical bending of the extension pipe of the first connection device after connection of the transfer pipe to that extension pipe.

12. The system according to claim 11, wherein each of said connection means comprises a first cryogenic swivel joint;
- wherein said at least three rigid sections of pipe comprises a short chain which includes:
  - four rigid sections of pipe, including a first rigid section of pipe located at a first end of the short chain and a second rigid section of pipe located at a second end of the short chain, the four rigid sections of pipe being fluidically connected each to the next by a respective first cryogenic swivel joint;
  - a second cryogenic swivel joint connected to a free end of the first rigid section of pipe; and
  - a third cryogenic swivel joint connected to a free end of the second rigid section of pipe;
- wherein the second and third cryogenic swivel joints are linked to the first and second connection devices, respectively, by a corresponding rigid tubular assembly, each of which includes a set of two fourth cryogenic swivel joints; and
- wherein the first, second, third and fourth cryogenic swivel joints are arranged so as to provide the transfer pipe with three degrees of rotational freedom.

13. The system according to claim 11, wherein
the first connection device comprises a centering part having an upwardly open cut-out, and wherein the centering part and a complementary part on the free end of the first end section of pipe are configured such that, as the free end of the first end section of pipe is lowered toward the first connection device from a position above the first connection device, the centering part guides the complementary part towards a connection position in which the complementary part is situated at a bottom of the cut-out.

14. The system according to claim 11, further comprising a device for storage of the transfer pipe in a folded state, the device for storage comprising a vertical support for each free end of the transfer pipe, wherein the transfer pipe in the folded state in the storage device is configured as a quadrilateral with two parallel sides.

\* \* \* \* \*